(12) United States Patent
Willcox

(10) Patent No.: US 8,327,713 B2
(45) Date of Patent: Dec. 11, 2012

(54) METHOD AND APPARATUS FOR PRESSURE MEASUREMENT USING MAGNETIC PROPERTY

(75) Inventor: Charles R. Willcox, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 950 days.

(21) Appl. No.: 12/327,057

(22) Filed: Dec. 3, 2008

(65) Prior Publication Data

US 2010/0132473 A1    Jun. 3, 2010

(51) Int. Cl.
*G01L 9/10* (2006.01)
*G01L 9/14* (2006.01)

(52) U.S. Cl. ............................. 73/722; 73/700; 73/728

(58) Field of Classification Search .................. None
See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,169,402 A | 2/1965 | Baker | 73/407 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,410,135 A | 11/1968 | Reynaud | 73/141 |
| 3,557,621 A | 1/1971 | Ferran | 73/398 |
| 3,561,832 A | 2/1971 | Karrer et al. | 310/9.6 |
| 3,697,835 A | 10/1972 | Satori | 317/246 |
| 3,808,480 A | 4/1974 | Johnston | 317/256 |
| 3,924,219 A | 12/1975 | Braun | 338/34 |
| 4,008,619 A | 2/1977 | Alcaide et al. | 73/398 |
| 4,120,206 A | 10/1978 | Rud | 73/718 |
| 4,158,217 A | 6/1979 | Bell | 361/283 |
| 4,161,123 A | 7/1979 | Carpenter | 73/741 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,244,226 A | 1/1981 | Green et al. | 73/703 |
| 4,287,553 A | 9/1981 | Braunlich | 361/283 |
| 4,322,775 A | 3/1982 | Delatorre | 361/283 |

(Continued)

FOREIGN PATENT DOCUMENTS

CN    1192272 A    9/1998

(Continued)

OTHER PUBLICATIONS

Notification of Transmittal of the International Search Report and the Written Opinion of the International Searching Authority, or the Declaration for International Application No. PCT/US2009/064712 filed Nov. 17, 2009; 14 pages.

(Continued)

*Primary Examiner* — Lisa Caputo
*Assistant Examiner* — Jermaine Jenkins
(74) *Attorney, Agent, or Firm* — Westman, Champlin & Kelly, P.A.

(57) ABSTRACT

A pressure sensor includes a sensor body which is arranged to couple to a process pressure. The sensor body has a magnetic property which changes as a function of pressure applied by a process fluid. A sensor is coupled to the sensor body and is configured to measure pressure of fluid in the sensor body as a function of a change of magnetic property of the sensor body.

29 Claims, 13 Drawing Sheets

U.S. PATENT DOCUMENTS

| | | | | |
|---|---|---|---|---|
| 4,336,567 | A | 6/1982 | Anastasia | 361/283 |
| 4,358,814 | A | 11/1982 | Lee et al. | 361/283 |
| 4,370,890 | A | 2/1983 | Frick | 73/718 |
| 4,389,895 | A | 6/1983 | Rud, Jr. | 73/724 |
| 4,422,125 | A | 12/1983 | Antonazzi et al. | 361/283 |
| 4,422,335 | A | 12/1983 | Ohnesorge et al. | 73/724 |
| 4,434,451 | A | 2/1984 | Delatorre | 361/283 |
| 4,455,874 | A | 6/1984 | Paros | 73/704 |
| 4,458,537 | A | 7/1984 | Bell et al. | 73/718 |
| 4,466,290 | A | 8/1984 | Frick | 73/756 |
| 4,490,773 | A | 12/1984 | Moffatt | 361/283 |
| 4,531,415 | A | 7/1985 | Orlowski et al. | 73/718 |
| 4,538,466 | A | 9/1985 | Kerber | 73/724 |
| 4,542,436 | A | 9/1985 | Carusillo | 361/283 |
| 4,558,184 | A | 12/1985 | Busch-Vishniac et al. | 381/174 |
| 4,562,742 | A | 1/1986 | Bell | 73/718 |
| 4,578,735 | A | 3/1986 | Knecht et al. | 361/283 |
| 4,586,108 | A | 4/1986 | Frick | 73/718 |
| 4,604,901 | A | 8/1986 | Kagi | 73/731 |
| 4,619,144 | A * | 10/1986 | Fremery et al. | 73/708 |
| 4,623,813 | A | 11/1986 | Naito et al. | 310/313 R |
| 4,644,796 | A | 2/1987 | Ward | 73/702 |
| 4,670,733 | A | 6/1987 | Bell | 338/36 |
| 4,739,666 | A | 4/1988 | Hafner et al. | 73/862.68 |
| 4,741,213 | A | 5/1988 | Hojoh | 73/702 |
| 4,785,669 | A | 11/1988 | Benson et al. | 73/718 |
| 4,829,826 | A | 5/1989 | Valentin et al. | 73/718 |
| 4,860,232 | A | 8/1989 | Lee et al. | 364/571.04 |
| 4,864,874 | A | 9/1989 | Hafner | 73/862.382 |
| 4,875,369 | A | 10/1989 | Delatorre | 73/151 |
| 4,878,012 | A | 10/1989 | Schulte et al. | 324/60 |
| 4,878,385 | A | 11/1989 | Lloyd | 73/704 |
| 4,926,674 | A | 5/1990 | Fossum et al. | 73/4 |
| 4,938,069 | A * | 7/1990 | Shoji et al. | 73/728 |
| 4,951,174 | A | 8/1990 | Grantham et al. | 361/283.1 |
| 4,977,480 | A | 12/1990 | Nishihara | 73/724 |
| 4,995,265 | A | 2/1991 | Stocker | 73/702 |
| 5,012,677 | A | 5/1991 | Shimada et al. | 73/721 |
| 5,094,109 | A | 3/1992 | Dean et al. | 73/718 |
| 5,136,885 | A | 8/1992 | Liebermann et al. | 73/702 |
| 5,144,841 | A | 9/1992 | Brouwers et al. | 73/706 |
| 5,165,284 | A * | 11/1992 | Shoji et al. | 73/728 |
| 5,168,419 | A | 12/1992 | Delatorre | 361/283 |
| 5,194,819 | A | 3/1993 | Briefer | 73/718 |
| 5,230,250 | A | 7/1993 | Delatorre | 73/733 |
| 5,233,875 | A | 8/1993 | Obermeier et al. | 73/718 |
| 5,291,795 | A | 3/1994 | Hafner | 73/862.629 |
| 5,329,818 | A | 7/1994 | Frick et al. | 73/708 |
| 5,349,868 | A * | 9/1994 | Shoji et al. | 73/728 |
| 5,355,714 | A * | 10/1994 | Suzuki et al. | 73/146.5 |
| 5,415,048 | A | 5/1995 | Diatschenko et al. | 73/861.04 |
| 5,469,749 | A | 11/1995 | Shimada et al. | 73/861.47 |
| 5,471,882 | A | 12/1995 | Wiggins | 73/702 |
| 5,490,424 | A * | 2/1996 | Shoji et al. | 73/728 |
| 5,492,016 | A | 2/1996 | Pinto et al. | 73/724 |
| 5,524,492 | A | 6/1996 | Frick | 73/706 |
| 5,531,120 | A | 7/1996 | Nagasu et al. | 73/706 |
| 5,542,300 | A | 8/1996 | Lee | 73/724 |
| 5,637,802 | A | 6/1997 | Frick et al. | 73/724 |
| 5,642,301 | A | 6/1997 | Warrior et al. | 364/571.02 |
| 5,705,751 | A * | 1/1998 | Briefer et al. | 73/722 |
| 5,705,978 | A | 1/1998 | Frick et al. | 340/511 |
| 5,757,608 | A | 5/1998 | Bernot et al. | 361/283.4 |
| 5,760,310 | A | 6/1998 | Rud et al. | 73/706 |
| 5,911,162 | A | 6/1999 | Denner | 73/718 |
| 5,920,016 | A | 7/1999 | Broden | 73/756 |
| 5,969,258 | A | 10/1999 | Gerst et al. | 73/718 |
| 5,992,240 | A | 11/1999 | Tsuruoka et al. | 73/718 |
| 6,003,219 | A | 12/1999 | Frick et al. | 29/25.41 |
| 6,236,096 | B1 | 5/2001 | Chang et al. | 257/419 |
| 6,250,164 | B1 | 6/2001 | O'Brien et al. | 73/730 |
| 6,295,875 | B1 | 10/2001 | Frick et al. | 73/718 |
| 6,301,973 | B1 | 10/2001 | Smith | 73/861.357 |
| 6,484,585 | B1 | 11/2002 | Sittler et al. | 73/718 |
| 6,484,586 | B1 * | 11/2002 | Dutoit et al. | 73/722 |
| 6,508,131 | B2 | 1/2003 | Frick | 73/756 |
| 6,520,020 | B1 | 2/2003 | Lutz et al. | 73/706 |
| 6,539,807 | B1 | 4/2003 | Wohlrab et al. | 73/723 |
| 6,543,291 | B1 | 4/2003 | Kurtz et al. | 73/716 |
| 6,564,643 | B1 | 5/2003 | Horie et al. | 73/724 |
| 6,647,794 | B1 | 11/2003 | Nelson et al. | 73/718 |
| 6,654,697 | B1 | 11/2003 | Eryurek et al. | 702/47 |
| 6,662,662 | B1 | 12/2003 | Nord et al. | 73/715 |
| 6,675,655 | B2 | 1/2004 | Broden | 73/716 |
| 6,701,274 | B1 | 3/2004 | Eryurek et al. | 702/140 |
| 6,828,801 | B1 | 12/2004 | Burdick et al. | 324/658 |
| 6,892,582 | B1 | 5/2005 | Satou et al. | 73/715 |
| 6,901,101 | B2 | 5/2005 | Frick | 372/92 |
| 6,945,115 | B1 | 9/2005 | Wang | 3/718 |
| 6,992,492 | B2 | 1/2006 | Burdick et al. | 324/658 |
| 7,104,137 | B2 * | 9/2006 | Baudendistel et al. | 73/722 |
| 7,379,629 | B1 | 5/2008 | Burns | 385/12 |
| 7,467,555 | B2 | 12/2008 | Schulte et al. | 73/736 |
| 7,540,196 | B2 | 6/2009 | Kurtz et al. | 73/714 |
| 7,624,642 | B2 | 12/2009 | Romo | 73/717 |
| 2002/0117006 | A1 | 8/2002 | Paros et al. | 73/717 |
| 2002/0178827 | A1 | 12/2002 | Wang | 73/718 |
| 2004/0015069 | A1 | 1/2004 | Brown | 600/407 |
| 2004/0093951 | A1 | 5/2004 | Viola et al. | 73/728 |
| 2004/0168523 | A1 | 9/2004 | Fernald et al. | 73/861.01 |
| 2004/0233458 | A1 | 11/2004 | Frick | 356/480 |
| 2005/0005712 | A1 | 1/2005 | Gysling et al. | 73/861.23 |
| 2005/0011278 | A1 | 1/2005 | Brown et al. | 73/861.18 |
| 2005/0041375 | A1 | 2/2005 | Rosenau | 361/524 |
| 2005/0063444 | A1 | 3/2005 | Frick | 372/92 |
| 2005/0097963 | A1 | 5/2005 | Wilda | 73/716 |
| 2005/0132808 | A1 | 6/2005 | Brown et al. | 73/592 |
| 2006/0070448 | A1 | 4/2006 | Baumann et al. | 73/730 |
| 2006/0206288 | A1 | 9/2006 | Brahmajosyula et al. | 702/183 |
| 2006/0232281 | A1 | 10/2006 | Vittorio et al. | 324/652 |
| 2006/0278005 | A1 | 12/2006 | Broden et al. | 73/716 |
| 2006/0278007 | A1 | 12/2006 | Harasyn et al. | 73/723 |
| 2007/0220985 | A1 | 9/2007 | Hedtke | 73/715 |

FOREIGN PATENT DOCUMENTS

| | | |
|---|---|---|
| DE | 1 932 899 | 1/1971 |
| DE | 3340834 A1 | 5/1985 |
| DE | 43 33 753 | 5/1994 |
| EP | 0 423 903 A2 | 6/1985 |
| EP | 0 524 550 A1 | 1/1993 |
| EP | 0291393 | 11/1998 |
| EP | 1 026 493 A2 | 8/2000 |
| FR | 941804 | 1/1949 |
| GB | 1530952 | 3/1976 |
| GB | 2178536 | 2/1987 |
| JP | 2005280536 | 10/2005 |
| WO | WO 93/04343 | 3/1993 |
| WO | WO 93/04349 | 3/1993 |
| WO | WO 99/53286 | 10/1999 |
| WO | WO 01/59418 | 8/2001 |
| WO | WO 01/59419 | 8/2001 |
| WO | WO 02/23148 | 3/2002 |
| WO | WO 2005/033643 | 4/2005 |
| WO | WO 2006/092052 | 9/2006 |
| WO | WO 2007/019676 | 2/2007 |

OTHER PUBLICATIONS

Notification of Transmittal of the International Search Report and the Written Opinion of the International Searching Authority, or the Declaration for International Application No. PCT/US2009/064716 filed Nov. 17, 2009; 13 pages.

Notification of Transmittal of the International Search Report and the Written Opinion of the International Searching Authority, or the Declaration for International Application No. PCT/US2009/064705 filed Nov. 17, 2009; 16 pages.

"Notification of Transmittal of the International Search Report and the Written Opinion of the International Searching Authority, or the Declaration"; PCT/US2006/046742; filed Jul. 12, 2006; 11 pages.

"Notification of Transmittal of the International Search Report and the Written Opinion" for PCT/US2007/012050.

"Notification of Transmittal of the International Search Report and the Written Opinion of the International Searching Authority, or the Declaration", PCT/US2006/036404, filed Sep. 19, 2006; 2 pages.

"International Search Report", PCT/US2006, 036404, filed Sep. 19, 2006; 3 pages.

"Written Opinion of the International Searching Authority", PCT/US2006/036404, filed Sep. 19, 2006; 6 pages.

Notification of Transmittal of the International Search Report and the Written Opinion of the International Searching Authority, or the Declaration of PCT/US2006/020254.

Notification of Transmittal of the International Search Report and the Written Opinion of the International Searching Authority, or the Declaration for PCT/US2006/019955.

Chinese Office Action from Application No. 200980148396.1, dated Jul. 4, 2012 along with its translation.

* cited by examiner

METHOD AND APPARATUS FOR PRESSURE MEASUREMENT USING MAGNETIC PROPERTY

CROSS REFERENCE TO RELATED APPLCIATIONS

This application is related to co-pending applications Ser. No. 12/327,050, filed Dec. 3, 2008, entitled METHOD AND APPARATUS FOR PRESSURE MEASUREMENT USING FILL TUBE; and Ser. No. 12/327,053, filed Dec. 3, 2008, entitled METHOD AND APPARATUS FOR PRESSURE MEASUREMENT USING QUARTZ CRYSTAL; which are hereby incorporated by reference in their entirety.

BACKGROUND OF THE INVENTION

The present invention relates to measurement of pressures in an industrial processes. More specifically, the present invention relates to a pressure sensor having a sensor body.

Industrial processes are used in the manufacturing and transport of many types of materials. In such systems, it is often required to measure different types of pressure within the process. One type of pressure which is frequently measured is a differential pressure which is the pressure difference between one point in the process and another point in the process. For example, the differential pressure across an orifice plate in a tube containing a flow of process fluid is related to the flow rate of the fluid. Differential pressures can also be used, for example, to measure height of a process fluid in a tank or other container.

In such industrial processes, the pressure sensors are typically contained in, or coupled to, a pressure transmitter which is located at a remote location and transmits the pressure information back to a centralized location such as a control room. The transmission is frequently over a process control loop. For example, a two wire process control loop is often used in which two wires are used to carry both information as well as power to the transmitter. Wireless communication techniques may also be used.

In many process installations, it is also desirable to measure an absolute or gauge pressure, herein referred to a "line pressure", of the process. This information can be used, for example, to provide more accurate flow measurements by including changes in density of the process fluid in the flow calculations. Typically, the additional pressure measurement requires an additional pressure sensor coupled to the process fluid. For example, an additional pressure transmitter can be deployed which includes a line pressure sensor and coupled to the two wire process control loop.

SUMMARY

A pressure sensor includes a sensor body which is arranged to couple to a process pressure. A magnetic property of the sensor body changes based upon applied pressure.

DETAILED DESCRIPTION

In one embodiment, the present invention provides an apparatus and method for determining line pressure in a differential pressure measurement configuration. More specifically, in one aspect, the present invention monitors deformations in a capillary tube used to couple a differential pressure sensor to process fluid. These deformations are related to line pressure of the process fluid. In other embodiments, the present invention provides techniques for measuring a pressure based upon deformation of a vessel. In another embodiment, the present invention provides a sensor for measuring line pressure.

Figure 1:
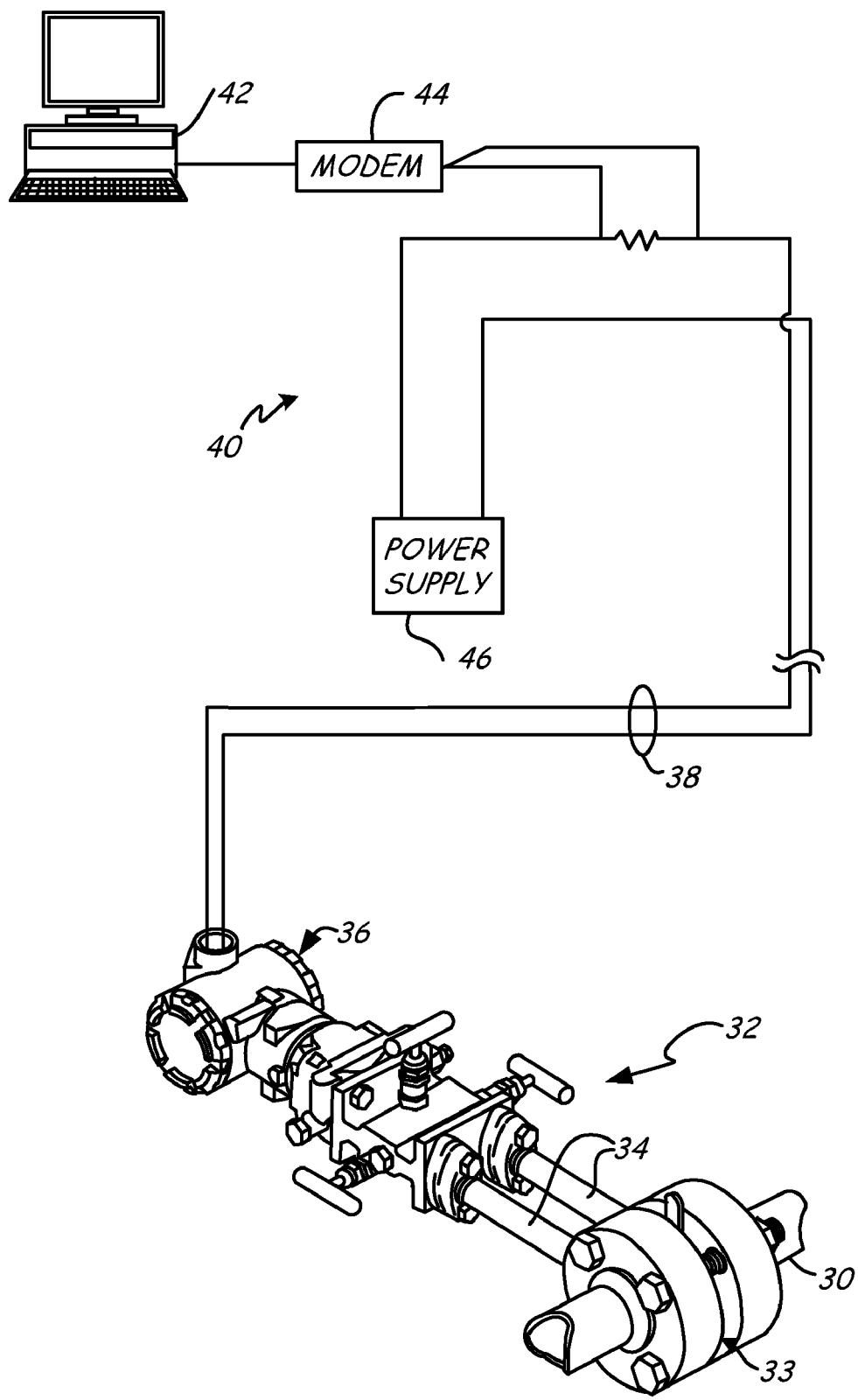
FIG. 1 shows a process measurement system with a process transmitter constructed in accordance with the present invention.

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses a differential process pressure and converts it to a standardized transmission signal that is a function of the process pressure.

A process loop 38 provides both a power signal to the transmitter 36 from control room 40 and bidirectional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A computer 42 or other information handling system through modem 44, or other network interface, is used for communication with the transmitter 36. A remote voltage power supply 46 powers the transmitter 36. In another example configuration, loop 38 is a wireless connection in which data may be transmitted or received with out the need of wires extending between the transmitter 36 and the control room 40. In other example configurations, data is transmitted and/or received wirelessly using a wireless communication protocol.

Figure 2:
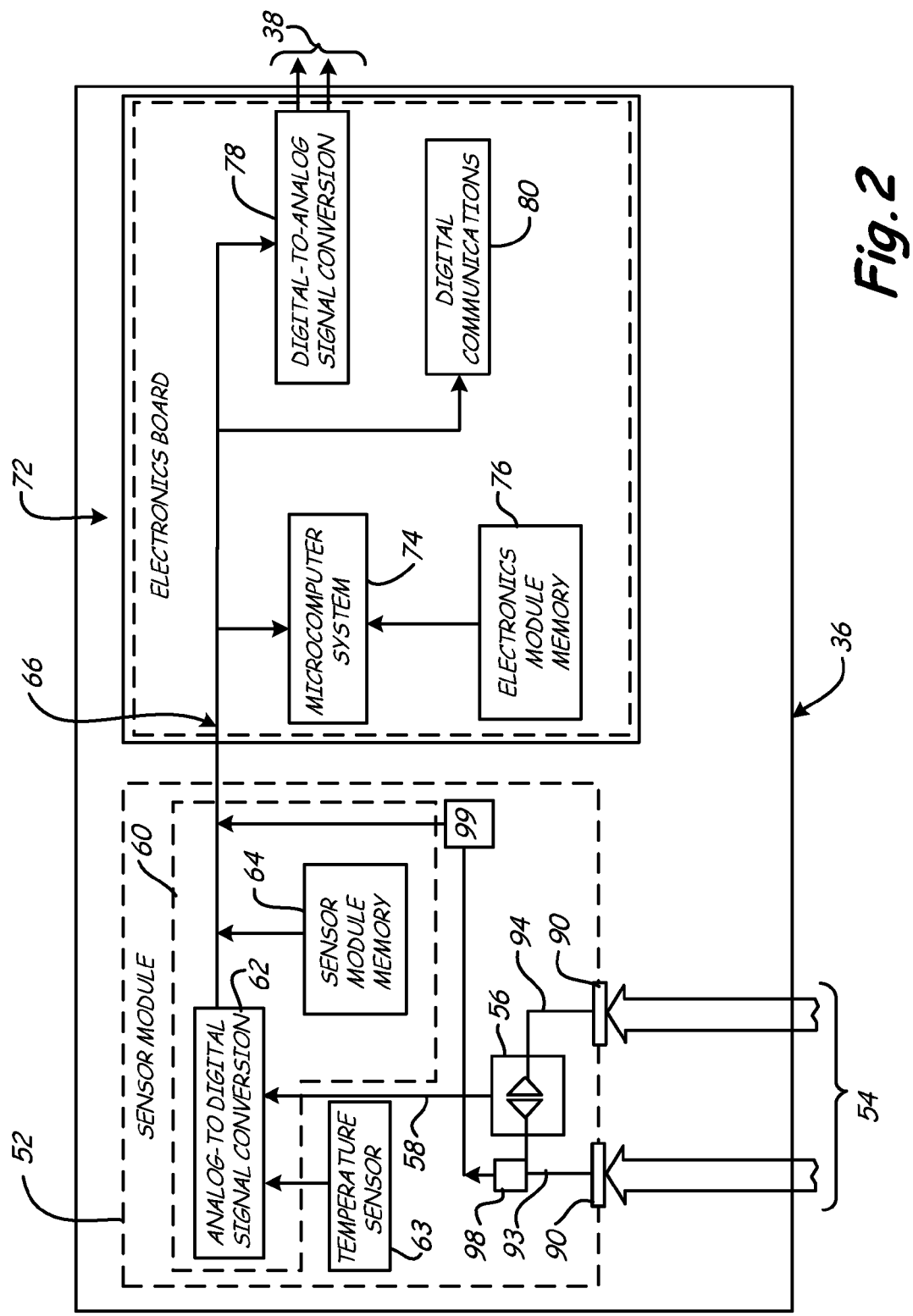
FIG. 2 is schematic view of a transmitter of FIG. 1.

FIG. 2 is a simplified block diagram of pressure transmitter 36. Pressure transmitter 36 includes a sensor module 52 and an electronics board 72 coupled together through a databus 66. Sensor module electronics 60 couples to pressure sensor 56 which received an applied differential pressure 54. The data connection 58 couples sensor 56 to an analog to digital converter 62. An optional temperature sensor 63 is also illustrated along with sensor module memory 64. The electronics board 72 includes a microcomputer system 74, electronics memory module 76, digital to analog signal conversion 78 and digital communication block 80.

Also illustrated in FIG. 2 are capillary or "fill" tubes 93 and 94 which are used to couple the differential pressure sensor 56 to the process fluid 54. Isolation diaphragms 90 receive pressures from the process fluid 54 which is responsibly applied to a fill fluid carried in capillary tubes 93 and 94. Through this fill fluid, the pressures of the industrial process are applied to the differential pressure sensor 56.

In accordance with the present invention, a deformation sensor 98 couples to a capillary tube 93 and is arranged to monitor deformation of the capillary tube 93. These deformations are related to the line pressure of the industrial process and the sensor 98 provides an output signal to analog to digital converter 62 or to line pressure measurement circuitry 99. In one aspect, any type of sensor can be used which is responsive to deformations of the tube. Circuitry 99 can be stand alone circuitry or, in some configurations, may be embodied in other circuitry used to measure the differential pressure. For example, some or all of the components used to monitor the various sensors may be shared components.

Figure 3:
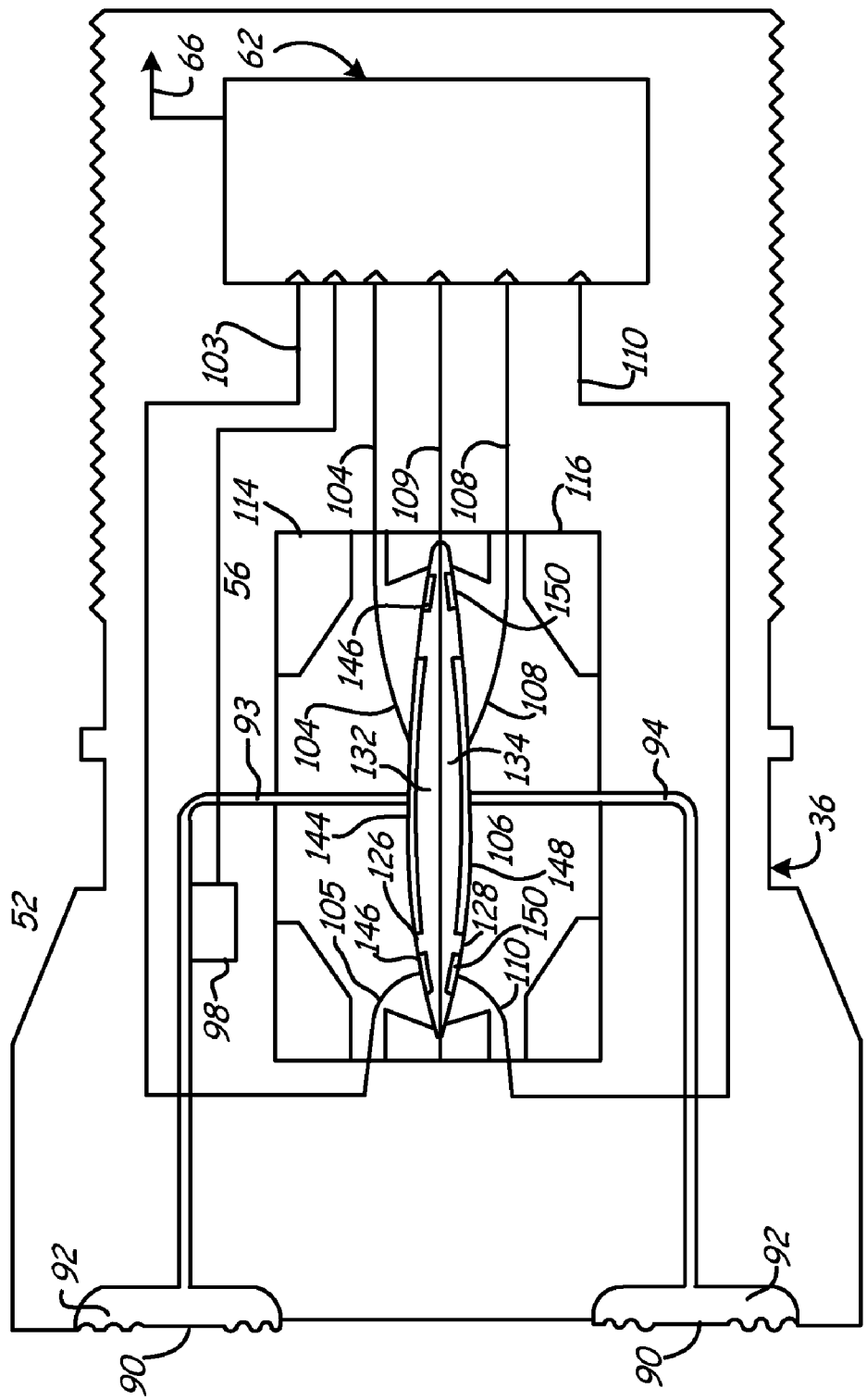
FIG. 3 shows a cross sectional view of a portion of the process transmitter of FIG. 1.

FIG. 3 is a simplified cross sectional view of one embodiment of the present invention illustrating the deformation sensor 98. As discussed above, pressure sensor 56 couples to a process fluid through isolation diaphragms 90 which isolate the process fluid from cavities 92. Cavities 92 couple to the pressure sensor module 56 through impulse piping 93 and 94. A substantially incompressible fill fluid fills cavities 92 and impulse piping 93 and 94. When a pressure from the process fluid is applied to diaphragms 90, it is transferred to parts in cavities 132 and 134 of the pressure sensor 56.

Pressure sensor 56 is formed from two pressure sensor halves 114 and 116 and filled with a preferably brittle, substantially incompressible material 105. A diaphragm 106 is suspended within a cavity 132,134 formed within the sensor 56. An outer wall of the cavity 132, 134 carries electrodes 146,144,148 and 150. These can, generally, be referred to as primary electrodes 144 and 148, and secondary or secondary electrodes 146 and 150. These electrodes form capacitors with respect to the moveable diaphragm 106. The capacitors, again, can be referred to as primary and secondary capacitors.

As illustrated in FIG. 3, the various electrodes in sensor 56 are coupled to analog to digital converter 62 over electrical connection 103, 104, 108 and 110. Additionally, the deflectable diaphragm 106 couples to analog to sensor module electronics 60 through connection 109. Techniques for measuring the differential pressure are described in U.S. Pat. No. 6,295,875 entitled "PROCESS PRESSURE MEASUREMENT DEVICES WITH IMPROVED ERROR COMPENSATION" issued Oct. 2, 2001, to Rosemount Inc.

The deformation sensor 98 may take various configurations. A number of example techniques for measuring the deformation are described below. However, in one broad aspect, the present invention is not limited to these particular techniques and any technique used to measure deformation may be employed including those that are not specifically discussed herein.

The line pressure from the process fluid causes the capillary tube 93 to change shape. For example, an increased line pressure may cause the capillary tube 93 to expand. Similarly, an increased line pressure may cause any bends in the capillary tube 93 to become straighter. These, or other deformations of a capillary tube, can be monitored or otherwise measured and correlated with the line pressure of the process fluid.

Figure 4:
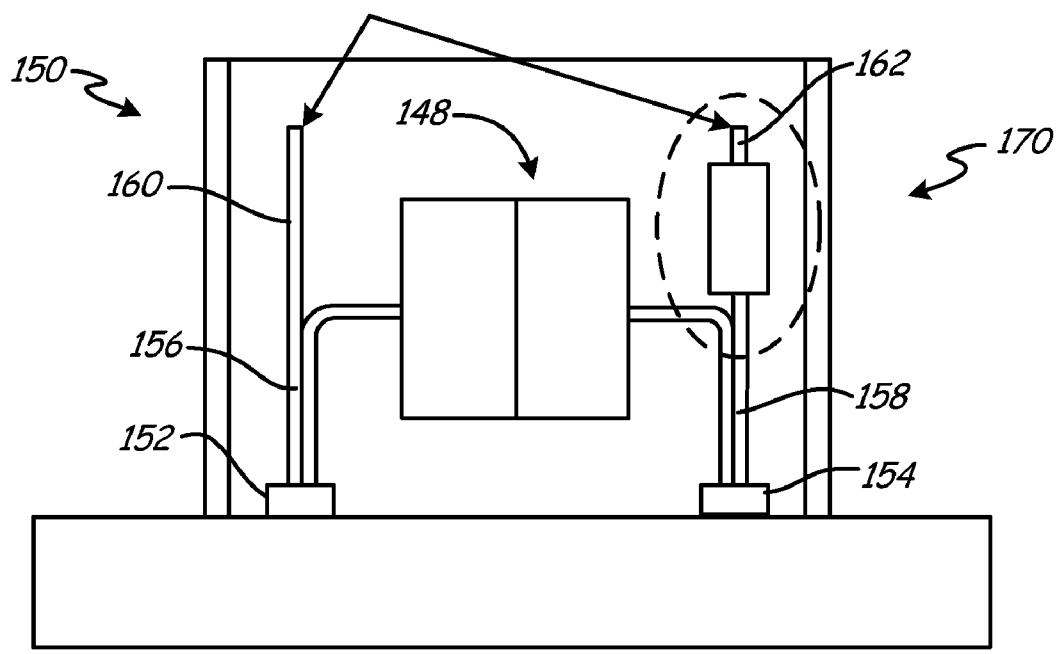
FIG. 4 is a simplified diagram showing line pressure measurement in one example configuration.

FIG. 4 is a simplified cross sectional view 150 of one example embodiment of the present invention. In the configuration of FIG. 4, a magnetostrictive property of the capillary or fill tube is used to measure deformation of the tube, which is one example of a sensor body. For example, if the fill tube is made from a nickel-iron alloy, the tube will exhibit magnetostrictive properties and will experience dimensional changes in the presence of a magnetic field. This also provides a reciprocal response such that if the metal undergoes strain, a change in magnetic induction is produced in direct proportion to the applied strain. The magnetostrictive property can be used to create a resonator (i.e., oscillator) that will cause the nickel-iron alloy to vibrate in a controlled manner. The vibration is a function of the dimension of the fill tube and its properties. Consequentially, the frequency will vary based on changes to the environment of the tube. By monitoring the frequency of the resonator, the physical state of the metal can be determined. In addition to measuring pressure, the magnetostrictive property is also related to temperature and may be used to provide a temperature measurement.

In the configuration of FIG. 4, a differential pressure sensor 148 is coupled to a process fluid to isolation diaphragms 152 and 154 through capillary tubes 156 and 158, respectively. Straight portions 160 and 162 of the capillary tubes 156, 158, respectively, are provided and may be used as fill tubes to fill the capillary tubes with fill fluid. These portions can be separate tubes or formed integral with tubes 156,158. Although these are shown as separate tubes, they may be formed as a single tube with tubes 156,158. Portion 162 includes a deformation sensor 170 which is configured to measure deformation of the fill tube.

Figure 5:
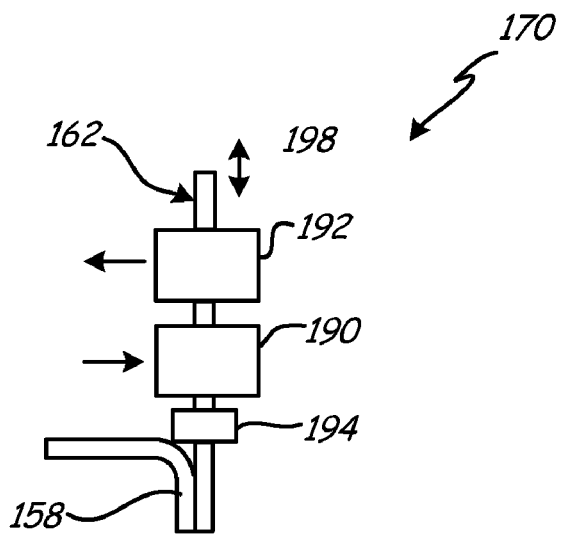
FIG. 5 is an enlargement of a portion of the configuration in FIG. 4.

FIG. 5 is a more detailed view of the deformation sensor 170 shown in FIG. 4. As illustrated in FIG. 5, a drive coil 190 is coupled to portion 162 and receives a control signal input, for example from circuitry 99 illustrated in FIG. 2. The drive coil 190 is driven at a desired frequency and induces a magnetic flux into the magnetostrictive material of 162. This causes a vibration motion 198 to occur in the portion 162. Typically, a permanent magnet (not shown) is located near the fill tube and coils to bias the tube into a favorable magnetic operating regime. A sense coil 192 is arranged adjacent to portion 162 and configured to sense the change in magnetic induction of the tube. This sense coil 192 provides an output. For example, this output can be provided to circuitry 99 illustrated in FIG. 2. A node stop 194 is also coupled to portion 162 and provides a rigid mount that is configured to reflect the longitudinal waves due to vibration 198 that occur within the tube portion 162 when oscillation begins.

Figure 6:
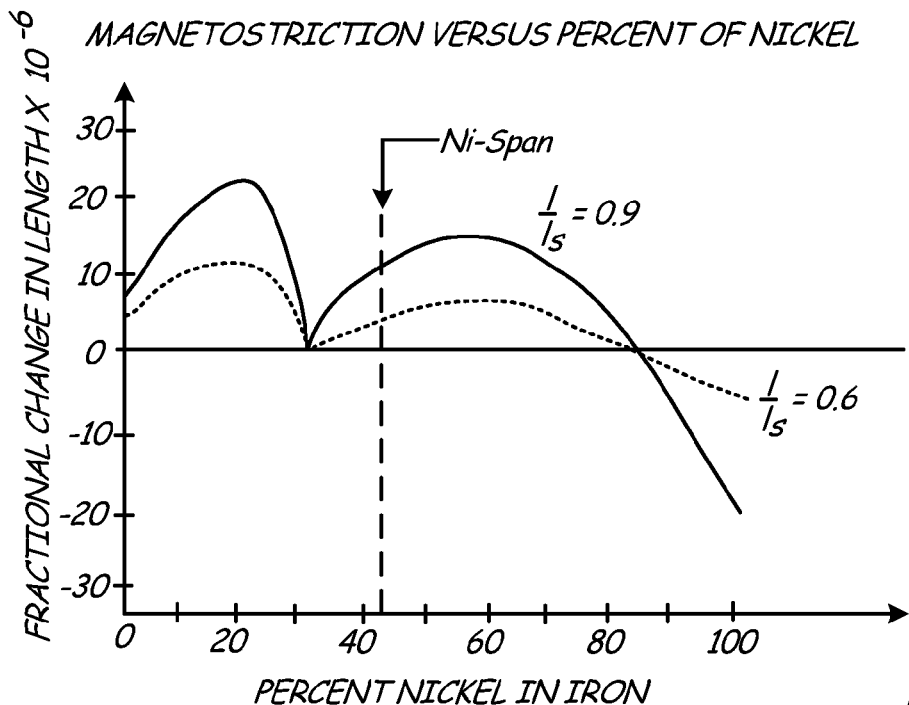
FIG. 6 is a graph showing magnetostriction versus percent of nickel.

Any appropriate magnetostrictive material may be used in accordance with the design constraints for a particular application. FIG. 6 is a graph of fractional change in length versus percent nickel in iron at different fractional field saturation levels and illustrates how the magnetostriction varies based upon the percentage of nickel in iron. Ni-Span has a percentage of Nickel of approximately 42% and produces a length increase in the presence of a magnetic field.

Figure 7:
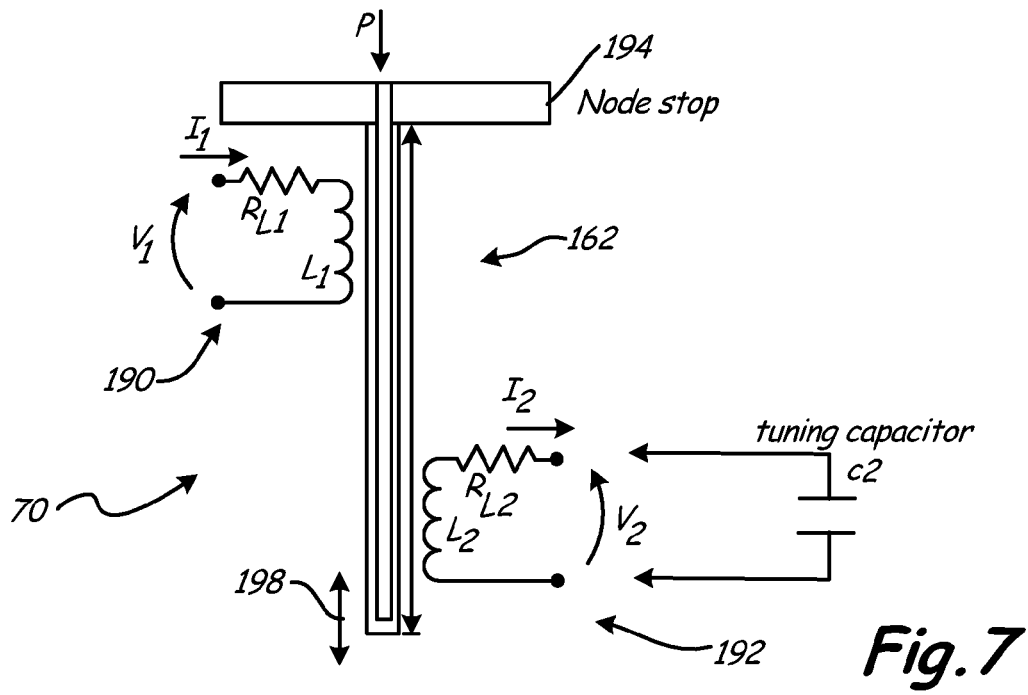
FIG. 7 is a simplified schematic diagram illustrating configurations shown in FIG. 4.

FIG. 7 is a simplified schematic diagram showing operation of deformation sensor 170 in greater detail. As illustrated in FIG. 7, the drive coil 190 is modeled as an inductance $L_1$ and a resistance $R_{L1}$. A current $I_1$ flows into the drive coil 190 and a voltage $V_1$ occurs across the drive coil 190. The sense coil 192 is similarly illustrated as an inductance $L_2$ and a resistance $R_{L2}$ with corresponding current $I_2$ and voltage $V_2$. A tuning capacitor C2 is applied across the sense coil 192. The length of the tube portion 162 is illustrated as l. During operation, the tube portion 162 will vibrate longitudinally with a fundamental frequency $f_1$ given by the expression:

$$f_1 = \frac{1}{4l}\sqrt{\frac{Eg}{\rho}} \qquad \text{EQ. 1}$$

where g, E, l, and ρ are respectively, the gravitational acceleration constant, the tube's Young's Modulus, length, and density of the tube 162. By placement of the drive coil 190 which generates the magnetic field, along with the sensor coil 192 it is possible to construct a positive feedback oscillator. The drive coil and sensor coil are schematically depicted in FIG. 7. If the resonating tube is closed on one end such that pressure can be applied on the opposite end (near the node stop 194), the tube will operate as a pressure sensor where the sensor output is the frequency $f_1$ of the oscillation and varies as a function of applied pressure. As the pressure changes, the frequency of oscillation will shift due to variations in the effective values of E, l, and ρ. The drive and sense coils are illustrated as inductors $L_1$ and $L_2$ with DC resistances $R_{L1}$ and $R_{L2}$. The tuning capacitor C2 in parallel with the sense coil 192 forms an LC oscillating circuit and may be selected to have a resonant frequency which is close to that of the resonator's fundamental frequency. Preferably, the LC circuit will ensure that the proper frequency occurs at startup. Once the metal begins to resonate, this will dominate the circuit such that the resonant frequency is representative of the tube oscillation rather than the self oscillating LC circuit.

Figure 8:
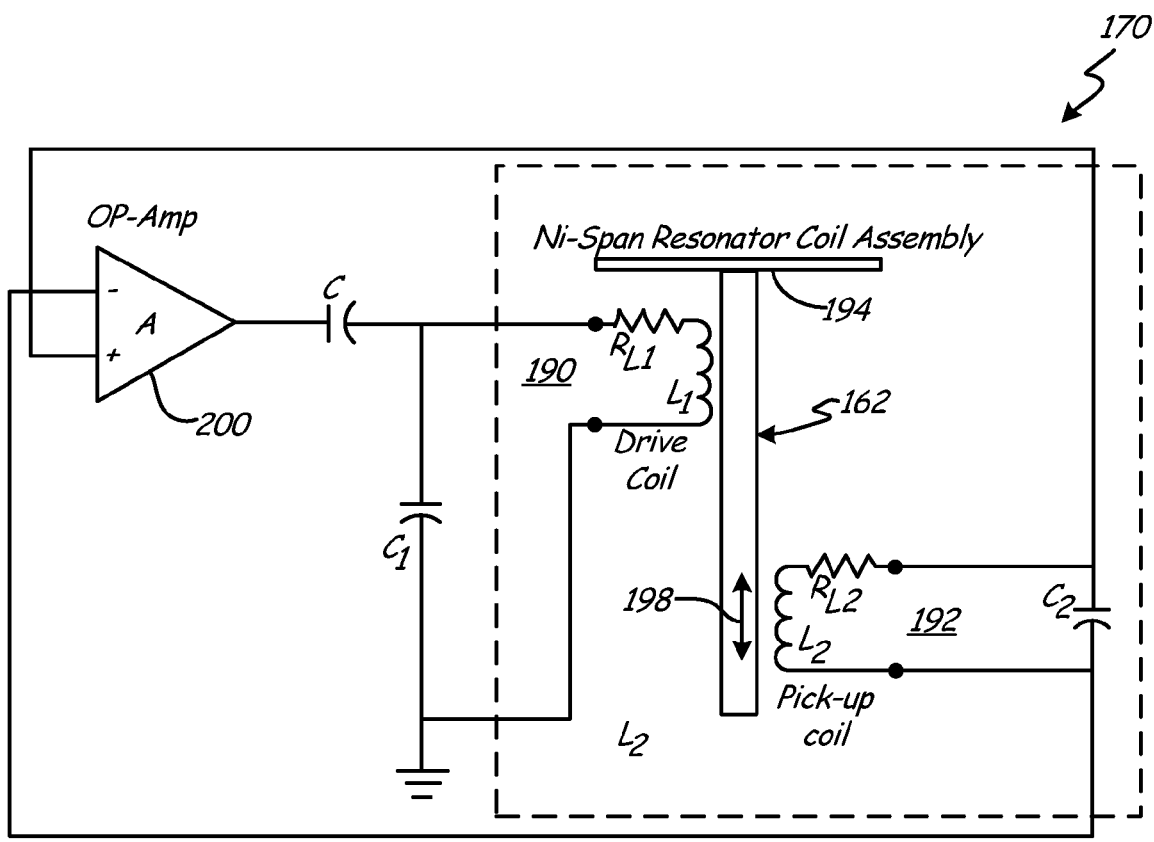
FIG. 8 is a simplified schematic diagram illustrating configurations shown in FIG. 4.
Figure 9:
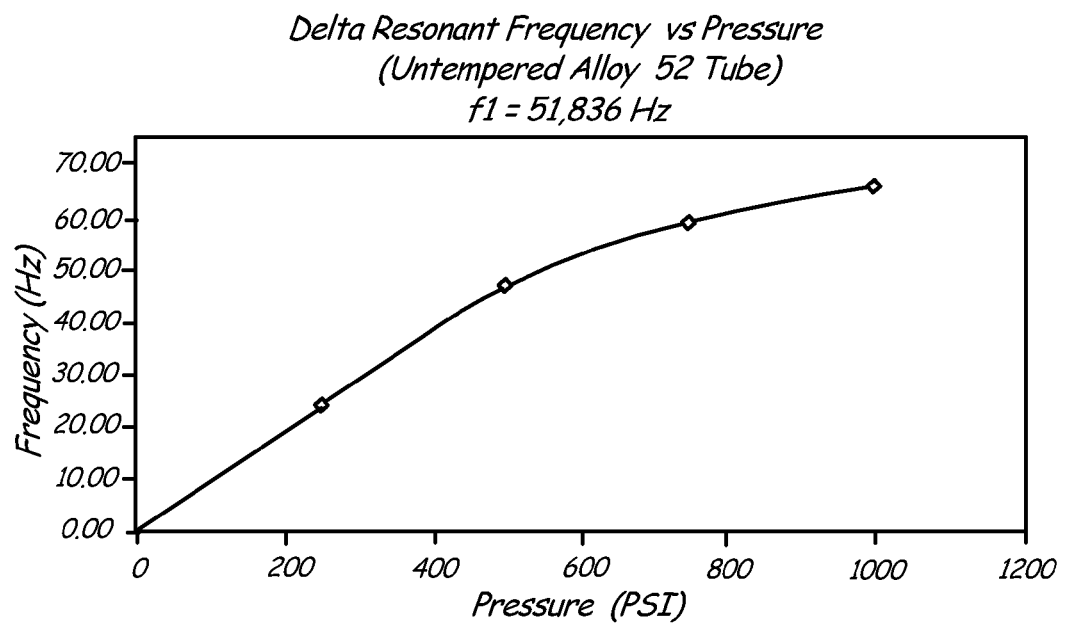
FIG. 9 is a graph of frequency versus pressure.

FIG. 8 is a simplified schematic diagram of an example resonator circuit using a large open loop gain op-amp 200. The coils 190,192 are arranged so that a 180 degree phase shift occurs near the tube's resonant frequency thereby maintaining sustained oscillation. In one example, a test device was constructed similar to that shown in FIG. 7. A frequency generator was connected to the drive coil 190 and an oscilloscope was connected to the sense coil 192. By sweeping the drive frequency, the tube's resonant frequency can be found. The tube was then pressurized and the new resonant frequency was determined. In this way, the change in frequency with changes in applied pressure was mapped. FIG. 9 is a graph of frequency versus pressure and shows actual data taken with a pressure sensor constructed from Alloy 52. Alloy 52 is 52% Nickel and 48% Iron. The tube was welded into a pressure fitting and the opposite end welded shut. The tube was not hardened and may have been somewhat annealed by the welding procedure. In this example, the tube walls were also thicker than needed to withstand overpressure. If thinner, the sensitivity of the sensor to pressure would be increased. In spite of these shortcomings, the frequency change with pressure is easily seen. The ultimate pressure resolution of the sensor is a function of the Q-factor possible from the tube assembly. To maintain large Q-factors, the tubes should be properly hardened. The example in FIG. 9 suggests a frequency change per PSI of approximately 0.065 Hz/PSI. A sensor having a Q-factor of 1000 and a resonant frequency centered at 51,000 Hz will have potential resolution of around 0.025 Hz (0.4 PSI). A Q-factor of 2500 will have a frequency resolution potential of 0.004 Hz. This latter Q-factor would allow line pressure resolutions on the order of 0.06 PSI.

As discussed herein, the present invention is not limited to these specific techniques for measuring deformation. Another example embodiment of the present invention utilizes the stress dependent magnetic permeability, for example, of nickel-iron alloys. Nickel-iron alloys exhibit a change in their magnetic permeability when the material is placed under strain. This behavior is referred to as the Villari effect. If the alloy is magnetically biased with a fixed magnetic field (H), the resulting magnetic induction (B) is defined according to:

$$B = \mu_0 \mu_R H \qquad \text{EQ. 2}$$

Figure 10:
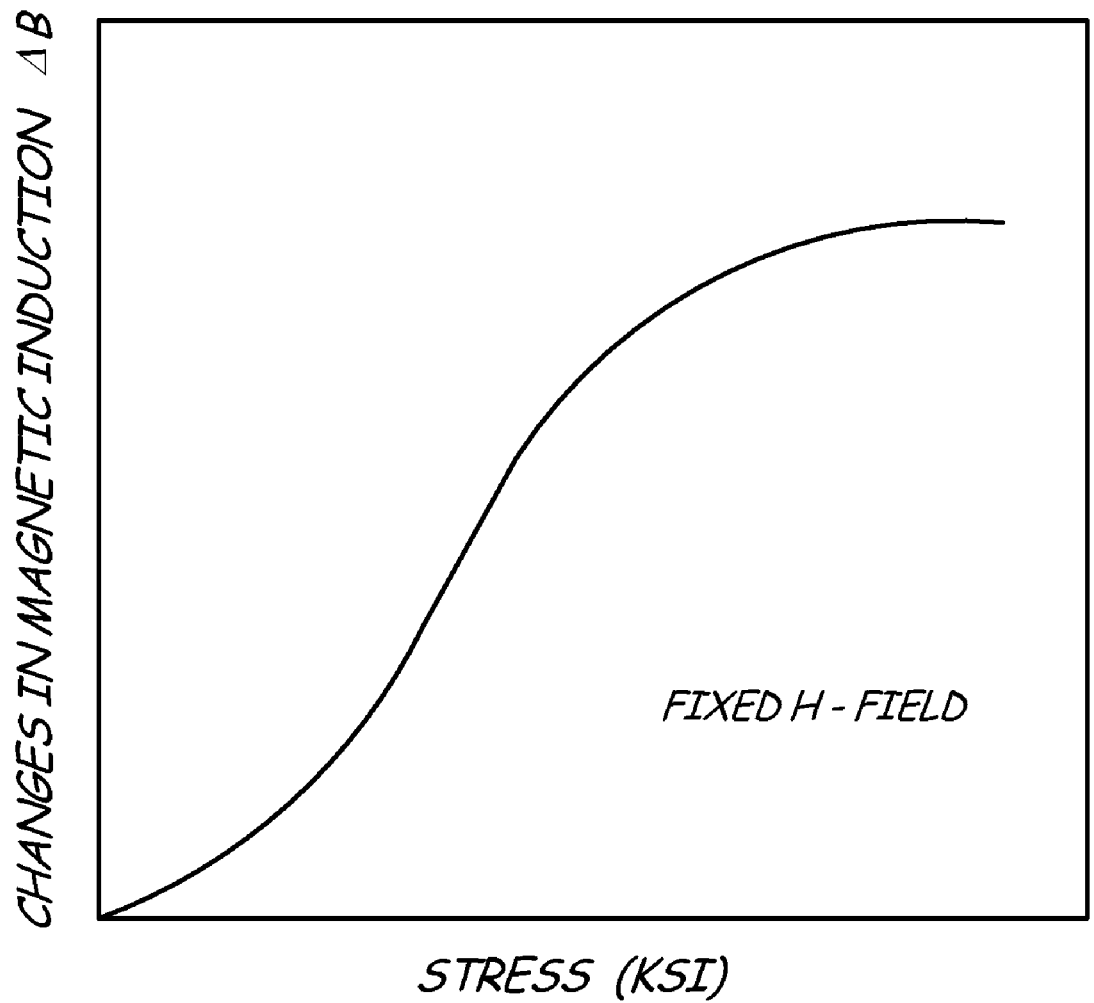
FIG. 10 is a graph of change in magnetic inductance versus stress.
Figure 11:
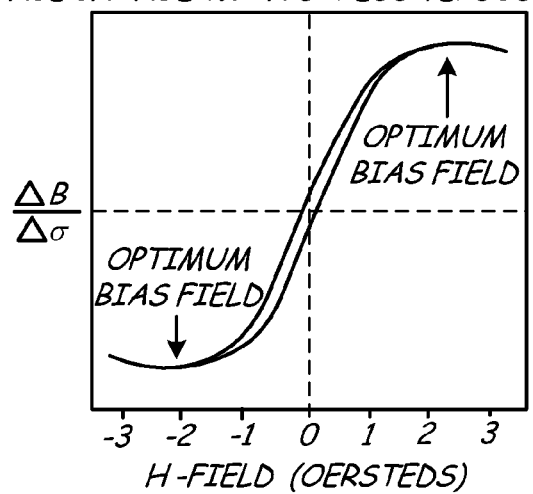
FIG. 11 is a graph of inductance change with stress versus an applied bias field.

Where, $\mu_0$ is the permeability of free space and $\mu_R$ is the relative permeability of the alloy. In accordance with Equation 2, any change with $\mu_R$ will result in a change in the magnetic inductance B. FIG. 10 is a graph of changes in magnetic induction versus applied stress for a fixed magnetic field H. Note that the sensitivity of the B field to changes in the applied stress is a function of the applied magnetic field H. Moreover, hysteretic properties of the material depend on the field strength, with the lowest hysteresis occurring at the higher field intensities. FIG. 11 is a graph showing inductance change with stress (σ is the applied stress) versus the applied bias field H. As illustrated in FIG. 11, there is a magnetic biasing point at which the hysteresis is a minimum and the sensitivity to applied stress is the greatest.

Figure 12A:
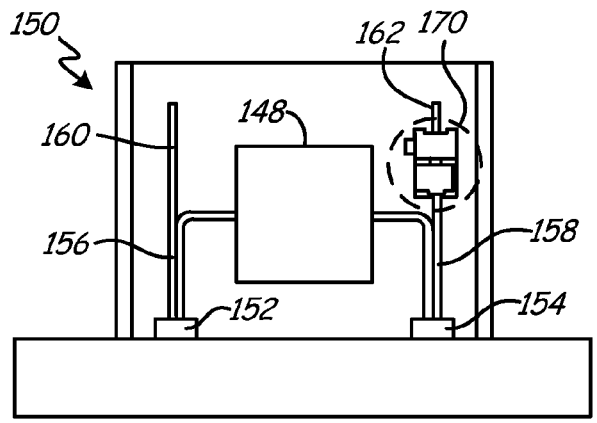
FIGS. 12A and 12B are simplified diagrams of a line pressure sensor in accordance with the present invention.
Figure 12B:
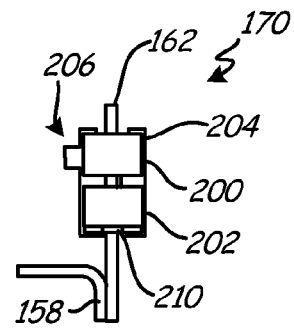

The above magnetic properties can be used to detect applied pressure. For example, the change in the B field can be measured using a coil having an inductance which is proportional to $\mu_R$. FIGS. 12A and 12B show one example configuration of sensor 170 arranged to detect pressure using this phenomenon. Elements in 12A and 12B which are similar to those shown in FIGS. 4 and 5 have retained their numbering. In this configuration, tube 162 may comprise, for example, Ni Span. Alloy 52 or nickel. A pick up coil 200 and a drive coil 202 surround tube 162 and are held in place by a clip 204. A bias magnet 206 is also mounted using clip 204. A coil stop 210 holds the coils in position with respect to tube 162. During operation, the bias magnet 206 provides a fixed bias field H about which a magnetic field is modulated using drive coil 202. The resultant B field is measured using pick up coil 200 and may be correlated with the applied pressure.

Figure 13:
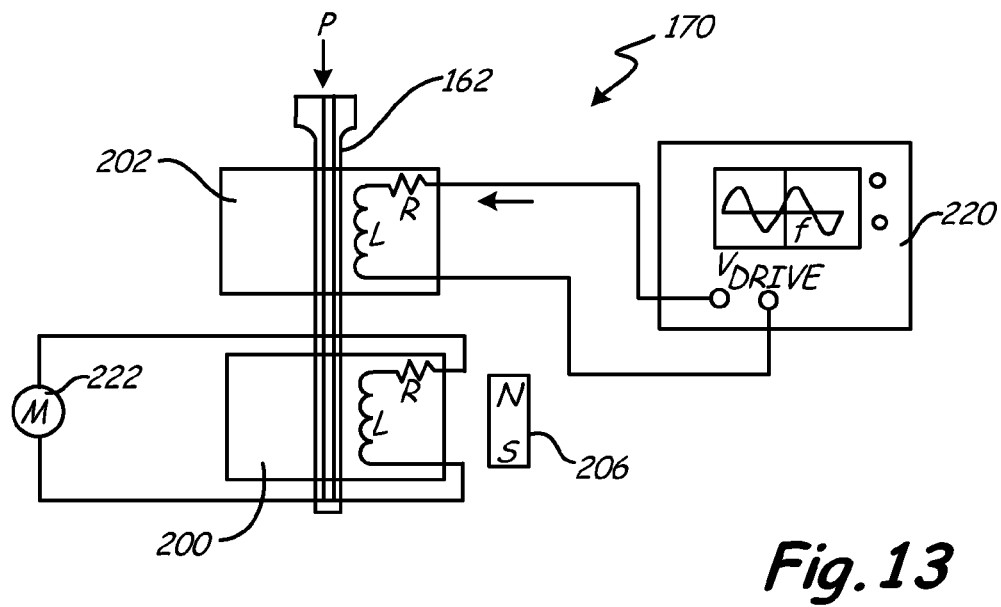
FIG. 13 is a schematic diagram in accordance with FIGS. 12A and 12B.

FIG. 13 is a schematic diagram of sensor 170 from FIG. 12B configured for electrical measurement. During operation, an AC signal generator 220 applies an alternating signal to the drive coil 202. The resultant B field is sensed using sensed coil 200. The magnitude of the signal is measured using meter 222 and is related to the permeability of the tube 162 and therefore changes with the applied pressure P. As discussed above, control of the AC signal generator 220 and sensing of the resultant signal in the sense coil can be performed by circuitry such as that shown in FIG. 3.

Figure 14A:
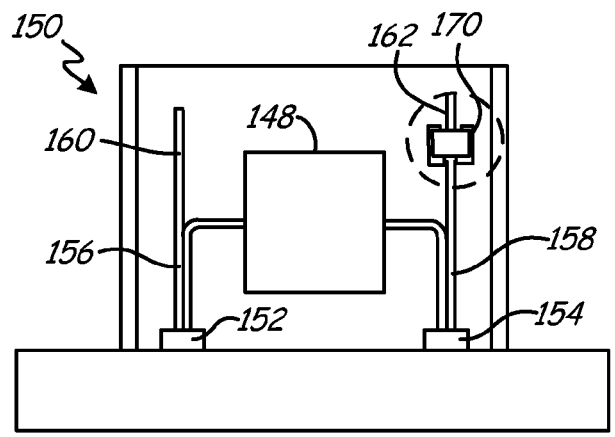
FIGS. 14A and 14B are simplified diagrams showing another example embodiment.
Figure 14B:
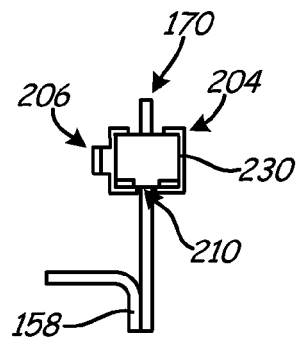
Figure 15:
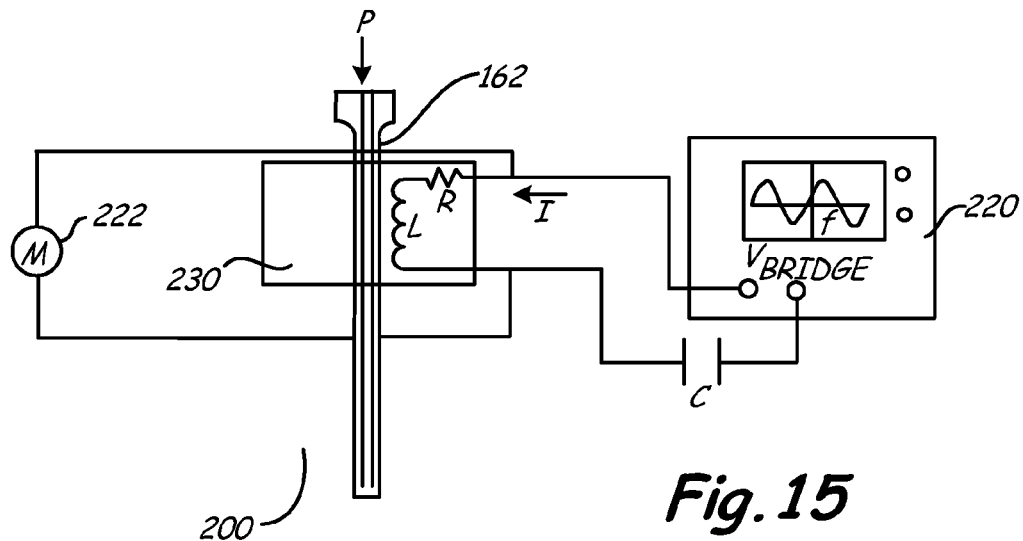
FIG. 15 is a schematic diagram in accordance with FIGS. 14A and 14B.

FIG. 14A and 14B are simplified diagrams showing another configuration of sensor 170. In FIGS. 14A and 14B, the numbering of elements used in other figures has been maintained for consistency. In the configuration of FIG. 14A and 14B, sensor 170 is arranged as a single coil 230. FIG. 15 is a simplified schematic diagram showing a circuit for sensing the B field using a single drive coil 230. In the configuration of FIG. 15, the AC signal generator 220 is coupled to the coil 230 through a capacitor C. The change in the B field due to the applied magnetic field may be sensed by measuring the magnitude of the voltage using voltage sensor 222 which is coupled across coil 230.

Figure 16:
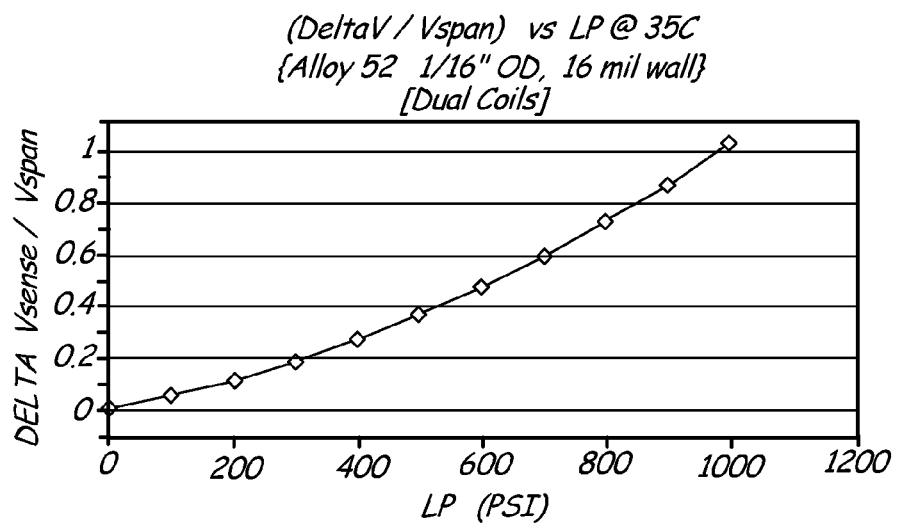
FIG. 16 is a graph which illustrates a change in voltage based upon an applied line pressure for a double coil design.
Figure 17:
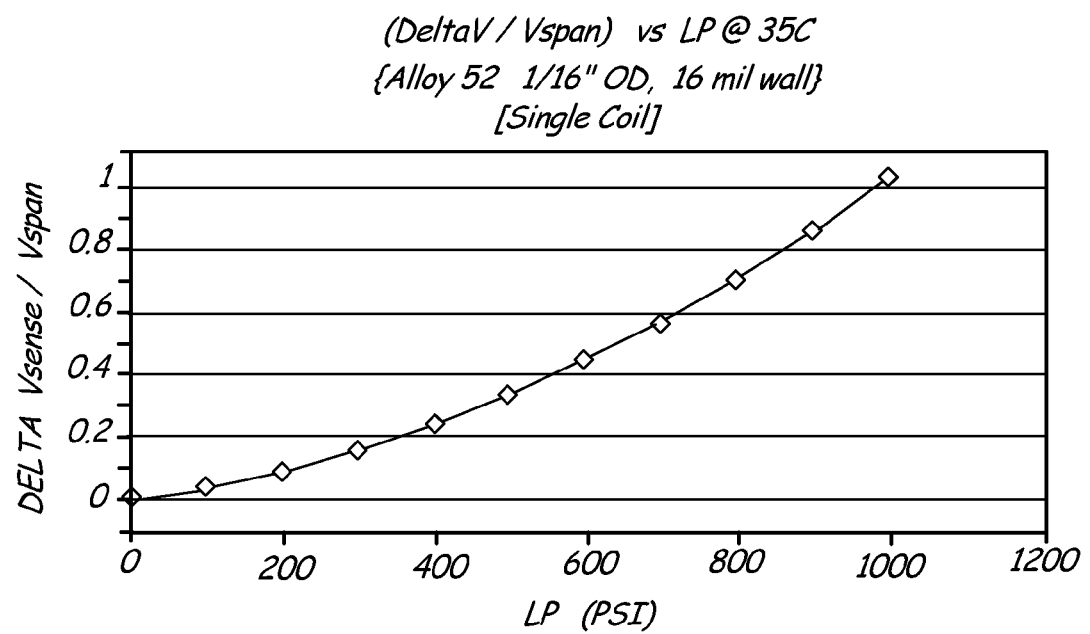
FIG. 17 is a graph which illustrates a change in voltage based upon an applied line pressure for a single coil design.

FIG. 16 is a graph of relative voltage change (as a fraction of span) in the output of a voltage sensor 222 versus line pressure from a dual coil sensor such as that shown in FIGS. 12A, 12B and 13. FIG. 17 is a similar graph for a single coil configuration such as that shown in FIGS. 14A, 14B and 15. As illustrated in FIGS. 16 and 17, the sensed voltage is related to the line pressure. A measurement circuit can be designed that oscillates with a frequency based on the inductance value of the tube, and therefore provide a means of measuring pressure as the inductance varied with pressure. This method is in contrast to the earlier describe method whereby the tube was made to mechanically oscillate at it longitudinal resonant frequency via a magnetostrictive drive mechanism.

In other design configurations, a second deformation sensor can be applied to the second fill tube. Using such a configuration, a redundancy check can be provided in which the outputs from the two deformation sensors are compared. Similarly, a differential pressure may be obtained by subtracting the pressure associated with one of the deformation sensors with the pressure associated with the other deformation sensor. Although the deformation sensor discussed herein is illustrated as being associated with the fill tube portion of the capillary tube, the sensor can be located along any appropriate region of the capillary tube and is not limited to this configuration. In another example configuration, the drive coil is associated with one of the capillary tubes while the sensor coil is associated with the other capillary tube. In such a configuration, line pressure as well as differential pressure may be obtained by monitoring the duty cycle in addition to the frequency of oscillation. Any appropriate material which illustrates a magnetostrictive effect may be used including, for example, Ni-Span, Alloy 52, a nickel-iron alloy, etc. Preferably, the oscillator is configured as a positive feedback oscillator.

Figure 18:
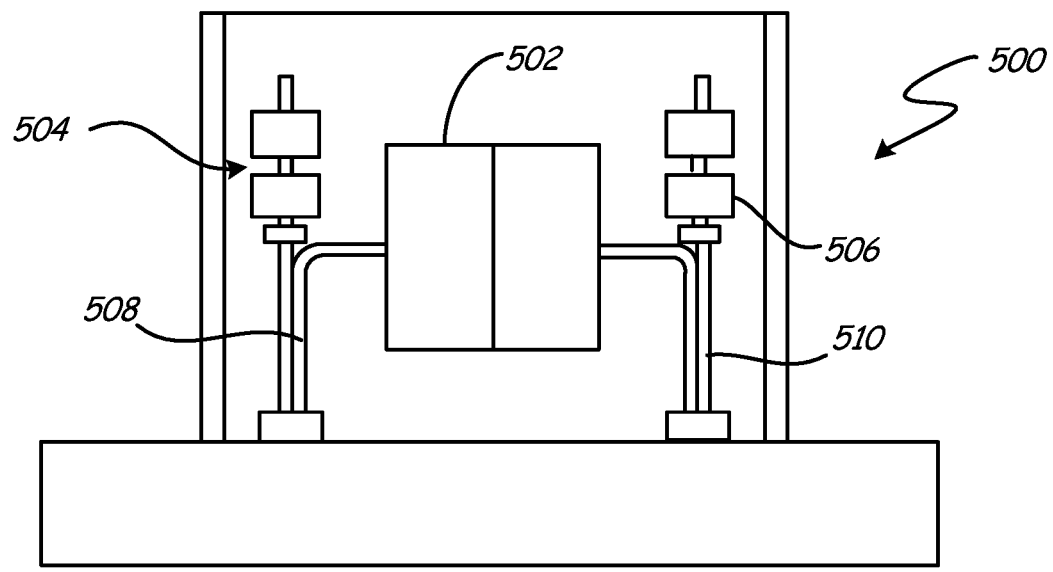
FIG. 18 is a side cross-sectional view of a pressure measurement system for measuring differential pressure.

FIG. 18 is a side cross-sectional view of a pressure measurement system 500 arranged to measure both differential pressure and line pressures. Using the configuration of FIG. 18, a differential pressure sensor 502 is coupled to the process fluid through fill tubes 508 and 510. Additional pressure sensors 504 and 506 are arranged to measure individual line pressures LP1 and LP2. These additional sensors can also be used to determine differential pressure based upon the difference between the two sensor outputs. The differential pressure measured by sensors 504 and 506 can be used to verify operation of differential pressure sensor 502. In another example, sensors 504 and 506 are used to measure differential pressure when the pressure value is out of range of pressure sensor 502. Any type of absolute pressure sensor such as those discussed above may be used to implement sensors 504 and 506.

Figure 19:
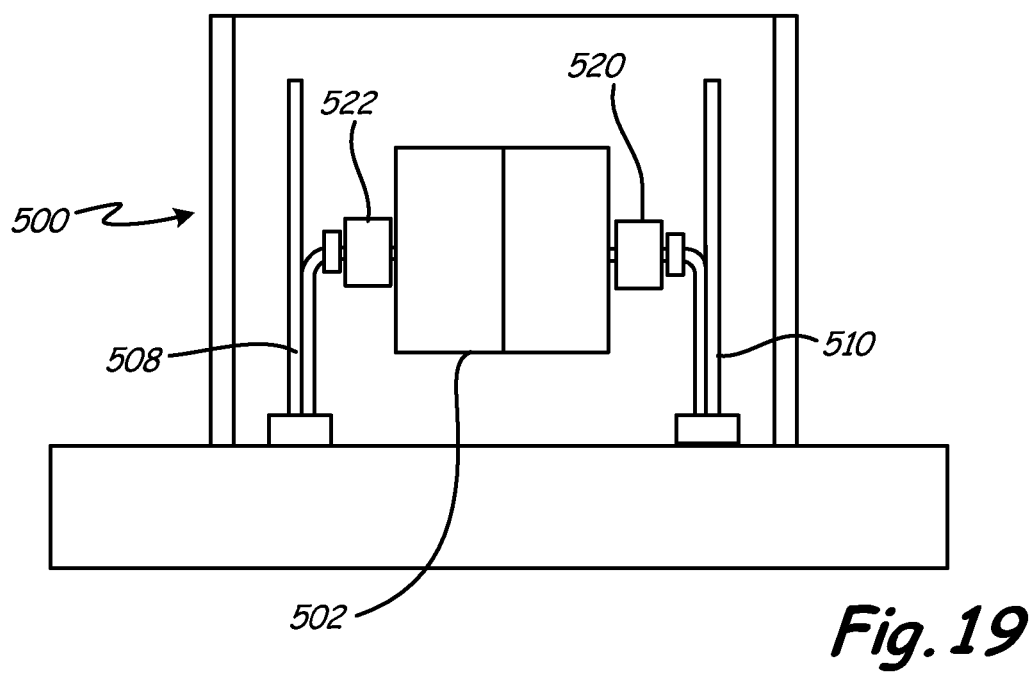
FIG. 19 is a side cross-sectional view of a pressure measurement system for measuring differential pressure.

FIG. 19 is a cross-sectional view of pressure measurement system 500 in accordance with another example embodiment. In FIG. 19, elements 520 and 522 may comprise individual line pressure sensors such as those discussed above. In another example embodiment, pressure tubes 508 and 510 comprise a metal which exhibits a magnetostrictive property and element 520 may comprise a drive coil while element 522 may comprise a sensor coil. In such a configuration, the entire differential pressure sensor 502 can be caused to vibrate using the techniques discussed above and the resonant frequency sensed by sense coil 522 will be a function of the differential pressure. This can be used to provide a redundant differential pressure measurement.

Although the present invention has been described with reference to preferred embodiments, workers skilled in the art will recognize that changes may be made in form and detail without departing from the spirit and scope of the invention. As used herein, line pressure refers to both absolute and gauge pressure.

What is claimed is:

1. A pressure sensor, comprising:
a sensor body having a magnetic property comprising magnetostriction or permeability of the sensor body which changes as a function of an applied pressure of a process fluid;
a pressure coupling adapted to couple the sensor body to a process fluid; and
circuitry configured to measure the magnetic property of the sensor body and provide an output indicative of the pressure as a function of the magnetic property.

2. The apparatus of claim 1 wherein the circuitry is configured to resonate as a function of the magnetic property.

3. The apparatus of claim 1 wherein the circuitry includes a drive coil which is driven at a desired frequency and arranged to induce a magnetic flux in the sensor body, the circuitry further including a sense coil.

4. The apparatus of claim 1 wherein the sensor body is configured to resonate mechanically due to a magnetostrictive effect and at a frequency related to the applied process pressure.

5. The apparatus of claim 4 including a node stop arranged to reflect vibrations in the sensor body.

6. The apparatus of claim 1 including a bias magnet adjacent the sensor body configured to apply a bias magnetic field.

7. The apparatus of claim 1 wherein the circuitry is further configured to measure a temperature of the sensor body as a function of the magnetic property.

8. The apparatus of claim 1 wherein the magnetic property comprises magnetic permeability.

9. The apparatus of claim 8 wherein the changes in the magnetic permeability of the sensor body is a function of strain placed on the sensor body due to the applied process pressure.

10. The apparatus of claim 1 wherein the circuitry is configured to sense a B field resultant from an applied AC magnetic field.

11. The apparatus of claim 10 wherein the circuitry is further configured to oscillate at a frequency based on the magnetic permeability property.

12. The apparatus of claim 1 including a second sensor body having a magnetic property which changes as a function of an applied pressure and wherein the circuitry is configured to measure a differential pressure based upon changes in the magnetic properties of the sensor body and the second sensor body.

13. The apparatus of claim 1 wherein the sensor body comprises a fill tube.

14. The apparatus of claim 1 including an isolation diaphragm configured to isolate a fluid in the sensor body from the process fluid.

15. The apparatus of claim 1 including a differential pressure sensor coupled to the sensor body configured to measure a differential pressure.

16. A method of measuring a pressure of the process fluid, comprising:
receiving the pressure of the process fluid in a sensor body, the sensor body having a magnetic property comprising magnetostriction or permeability of the sensor body which changes as a function of the applied pressure;

sensing a change in the magnetic property of the sensor body; and providing an output indicative of the pressure based upon a sensed change of the magnetic property.

17. The method of claim 16 including a resonating circuit which is a function of the magnetic property.

18. The method of claim 17 including providing a drive coil which is driven at a desired frequency and arranged to induce a magnetic flux in the fill tube body.

19. The method of claim 17 wherein the circuitry is further configured to oscillate at frequency based on the magnetic permeability.

20. The method of claim 16 wherein the sensor body is configured to resonate mechanically due to the magnetostrictive effect and as a function of the applied process pressure.

21. The method of claim 20 including providing a node stop arranged to reflect vibrations in the sensor body.

22. The method of claim 16 including providing a bias magnet adjacent the sensor body configured to apply a bias magnetic field.

23. The method of claim 16 including measuring a temperature of the sensor body as a function of the magnetic property.

24. The method of claim 16 wherein the magnetic property comprises magnetic permeability.

25. The method of claim 24 wherein the changes in the magnetic permeability of the sensor body is a function of strain placed on the sensor body due to the applied process pressure.

26. The method of claim 16 including sensing a B field resultant from an applied AC magnetic field.

27. The method of claim 16 including providing a second sensor body having a magnetic property which changes as a function of an applied pressure measuring a differential pressure based upon changes in the magnetic properties of the sensor body and the second sensor body.

28. The method of claim 16 wherein the sensor body comprises a fill tube.

29. The method of claim 16 including providing an isolation diaphragm configured to isolate a fluid in the sensor body from the process fluid.

* * * * *